No. 772,354. PATENTED OCT. 18, 1904.
H. HARMET.
ELECTRIC FURNACE.
APPLICATION FILED MAR. 20, 1902.
NO MODEL. 3 SHEETS—SHEET 1.

Witnesses
Wilhelm Vogt
Thomas M. Smith.

Inventor
Henri Harmet,
by J. Walter Douglass
Attorney.

No. 772,354. Patented October 18, 1904.

UNITED STATES PATENT OFFICE.

HENRI HARMET, OF ST. ETIENNE, FRANCE.

ELECTRIC FURNACE.

SPECIFICATION forming part of Letters Patent No. 772,354, dated October 18, 1904.

Application filed March 20, 1902. Serial No. 99,068. (No model.)

*To all whom it may concern:*

Be it known that I, HENRI HARMET, a citizen of the Republic of France, residing at St. Etienne, Loire, in the Republic of France, have invented certain new and useful Improvements in the Manufacture of Iron and Steel from Ores by Electrometallurgy, of which the following is a specification.

My invention has relation to an apparatus for the conversion of ores directly into iron or steel by a continuous series of electrometallurgical operations.

In the carrying out of my invention there are used three parts coöperating to form a complete apparatus for the direct conversion of the mineral into iron or steel of desired grade or purity. These parts of the apparatus are designed to convert the ore or mineral by the use of the electric current and collectively form what may be termed an "electric" furnace.

The steps in the process or method of converting the ore or mineral are essentially four and may be generally termed, first, calcination of the mineral or ore and the flux; second, reduction of the calcined ore and flux with the carbon fuel; third, fusion of the reduced ore, and, fourth, the regulation of the purity or quality of the reduced and fused metal. The three main parts of the electric furnace by means of which these four steps in the process or method may be carried out are, first, a calciner; second, a reducer, wherein the mineral is both reduced and fused, and, third, the regulator or refining-oven, in which the crude liquid metal is brought to the state required.

The nature and scope of my invention will be more fully understood from the following description, taken in connection with the accompanying drawings, forming part hereof, in which—

Figure 7:
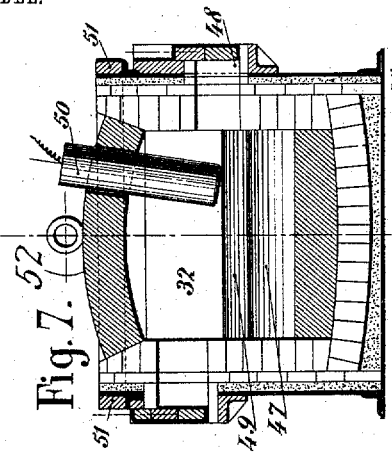
Figure 8:
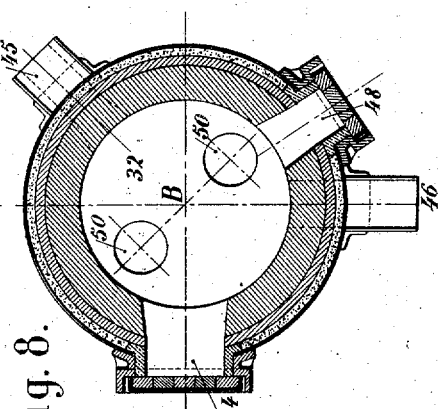
Figure 6:
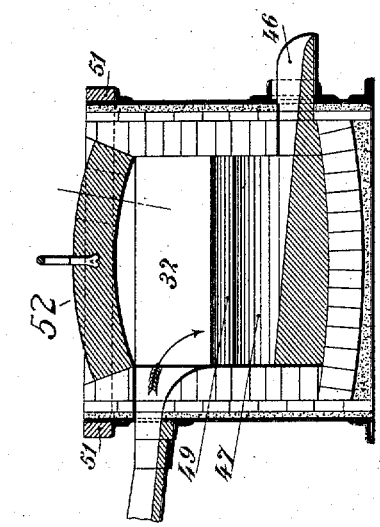
Figure 1:
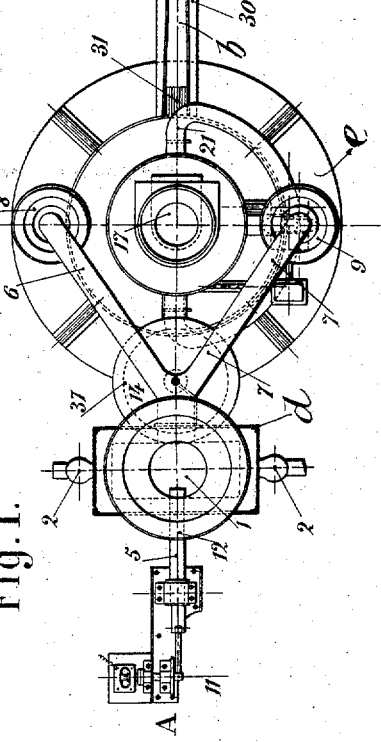
Figure 2:
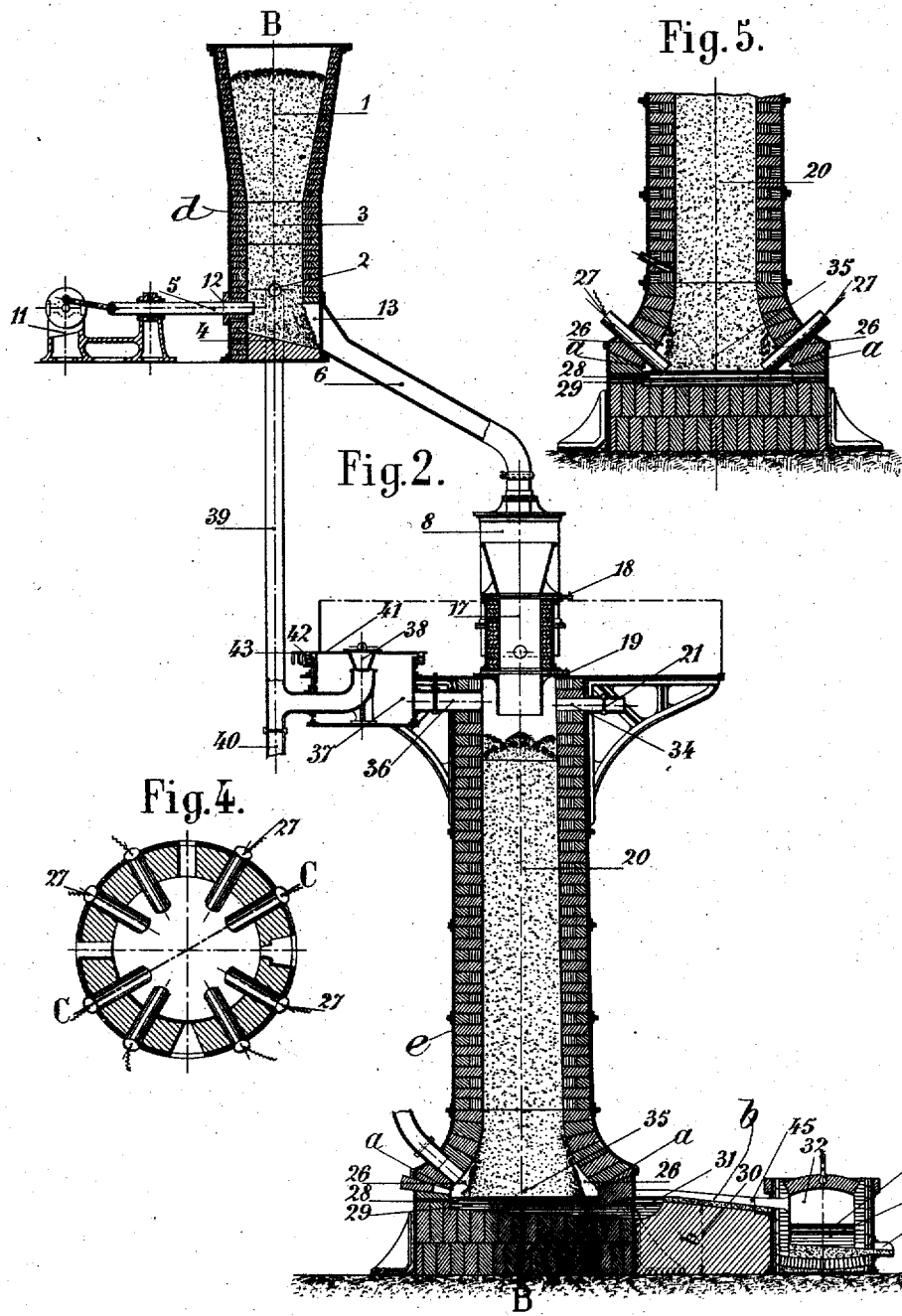
Figure 3:
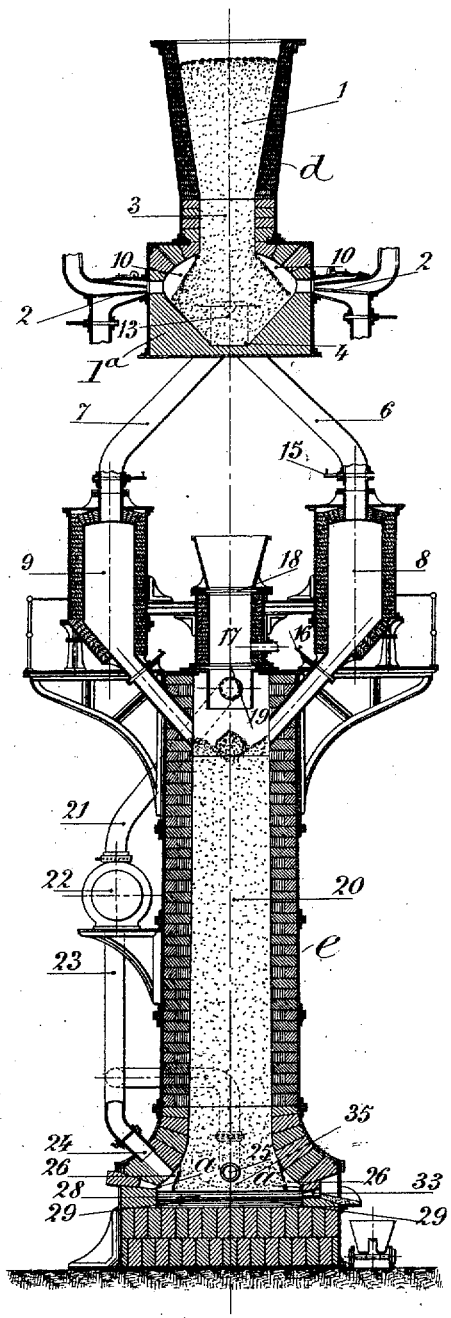

Figure 1 is a top or plan view of an electric furnace embodying main features of my invention. Fig. 2 is a vertical sectional view of the furnace, the section being taken on a plane passing through the axis of the reducer, the tap-hole for the metal, and one of the pipes for blowing in the gases. Fig. 3 is a similar view, the section being taken on the line B B of Fig. 2. Fig. 4 is a horizontal sectional view taken through the axis of the carbon electrodes of the reducer, the axis of the tap-holes for the metal and slag, and the axis of the holes for blowing in the gases. Fig. 5 is a vertical sectional view of the base of the reducer, the section being taken on the line $c\ c$ of Fig. 4; and Figs. 6, 7, and 8 are enlarged sectional views illustrating the construction and arrangement of the regulator.

Referring to the drawings, $d$ represents the calciner for the ore and fluxes, having a receiving-chamber 1 of inverted conical form, into which the crude materials, except the coke, are placed in successive charges or layers. The base 3 of the chamber 1 is contracted, and below the base 3 of the chamber 1 is an enlarged chamber $1^a$, into which the materials fall from the contracted part 3. This chamber $1^a$ is so shaped and enlarged as to leave a space 10 in addition to the sloping sides of the material falling into said chamber. Into the enlarged chamber $1^a$ discharge heated gases from the blowpipes 2. The source of these heated gases will be hereinafter described. The peculiar shape of the calciner $d$, as illustrated clearly in Fig. 3, secures the proper calcination of the materials before they reach the sole 4 of the calciner. Thus the top of the chamber 1 is made wider than its base or contracted part 3 in order that the materials may be slowly heated to properly dry them. It is contracted, as at 3, in order to give to the materials at that point a concentration of heat and to make all of the materials attain the same temperature. Again, it has the enlarged chamber $1^a$, so that a space 10 may be formed above and around the naturally-sloping sides of the materials falling into said chamber, which space 10 promotes the combustion and allows of the circulation and subdivision of the gases around the materials after the gases enter from the blowpipes 2. The materials treated in the calciner $d$, consisting mainly of the ore and a suitable flux, arrive at the sole 4 in a dried condition, with the water of combination, carbonic acid, and all volatile matters driven off and the materials at a red heat. An oscillating piston or stoker 5 then pushes the red-hot materials with regulated speed into the passages 6 and 7, from whence they pass into the chargers 8 or 9. The sole 4 of the calciner $d$ may be inclined or not, as desired; but for economical working of the process and apparatus and in order to make the feed of the calciner identical with the feed of the reducer $e$ it is necessary that the materials should reach the sole 4 in red-hot condition and pass therefrom with regularity into the chargers 8 or 9 to insure a space for the fresh material passing through the calciner. To accomplish this regularity of feed and to prevent the cooling of the materials in the sole 4, the plunger or stoker 5 passes through a hole or opening 12 in the side of the chamber $1^a$ of a diameter approximately equal to the diameter of the plunger $f$, and the reciprocation of the plunger or stoker 5 is secured by means external to the calciner $d$. At each alternate movement of the plunger 5 a regulated quantity of the materials are pushed from the sole 4 into the passages 6 and 7, and the feed of the materials from the sole can hence be regulated by increasing or decreasing the speed at which the plunger 5 travels, as well as by varying the stroke of the plunger. The lower chamber $1^a$ is pierced by a number of openings, which, however, are sealed, so that the external air may not enter therethrough into the chamber $1^a$. These openings are filled either by the blowpipes 2, the plunger 5, or, as in the case of the openings 13, are continuations of the passages 6 and 7, leading to the chargers 8 and 9. The hot gases which enter the chamber $1^a$ through the blowpipes 2 have hence no exit to the external air, and hence are obliged to traverse the materials in the calciner $d$ in a vertical direction and to pass out at the top of the receiving-chamber 1. This sealing of the lower chamber or hearth $1^a$ is one of the main features of the calciner. In the opening 13 from the chamber $1^a$ is arranged a trap-door 14, rotating upon an axis and serving to direct the materials passing out of the calciner into one or the other of the passages 6 and 7, and hence into one or the other of the chargers 8 or 9. The passages 6 and 7 are formed of pipes inclined to facilitate the passage of the materials therethrough and closed intermediate of their ends. The upper ends of the passages 6 and 7 open into the calciner, whereas the other ends empty, respectively, into the chargers 8 or 9 without the passages communicating at any point with the outer atmosphere. Both chargers 8 and 9 are constructed in the same manner. The charger 8 consists of a metal chamber lined with refractory material on the inside and having entrance and exit ends controlled by registers or valves 15 and 16. When the trap-door 14 is turned to close the passage 7, the material passes into the passage 6 and thence when the register 15 is open into the charger 8, in which it remains while the lower register 16 is closed. When the charger 8 is filled, the door 14 is swung around and the upper register 15 is closed, and the calcined matters are now fed to the other charger, 9. The register 16 of the charger 8 when opened permits the whole charge to enter the mouth or upper end of the reducer $e$. The next charge will enter from the charger 9, which is filled and discharged in the same manner as is the charger 8. All the charges from the charger 8 or 9 enter the reducer $e$ in a hot condition, and as the reducer is that part of the apparatus which requires the most auxiliary heat from the electric current the entrance of the calcined ores and fluxes in a hot condition is desirable. The reducing-carbon (coke by preference) should likewise enter the reducer in a heated condition, and for that reason it is caused to pass through the heater 17, in which it is submitted to the high temperature obtained from the waste heat of the regulator $f$ or from the hot gases fed into the heater by the blowpipes, the gases coming, preferably, from the mouth of the reducer $e$. The heater 17 is situated centrally above the mouth of the reducer $e$ and has the upper and lower charging-registers 18 and 19, so that the reducing-carbon is caused to pass into the mouth of the reducer by successive charges in a manner similar to the feeding of successive charges of the calcined materials from the chargers 8 and 9. The carbon fuel loses it humidity before it leaves the heater 17 and enters the reducer $e$ in a dry and highly-heated condition. The reducer $e$ is thus fed with calcined materials from the chargers 8 and 9 and calcined coke from the heater 17 in desired proportions and at an initially high temperature. The materials thus charged descend in the reducer $e$ and mix in its interior. During this descent the oxids are reduced and are melted in the crucible or hearth of the reducer $e$ under the heat generated by an electric current, as well as an auxiliary heat caused by taking the gases from the top or mouth of the reducer $e$ and blowing or forcing them under pressure into the fusion zone of the reducer and causing them to traverse vertically upward the charge in the reducer $e$. The reducer $e$ is so designed as to permit of the ready descent of the materials and of their successive reduction and fusion. The main or receiving chamber 20 of the reducer $e$ is conical or downwardly tapering and terminates in a flaring bell-mouth 25, which constitutes the crucible or hearth of the reducer. This form is necessary to permit of the proper downward movement of the materials for the reason that at the top or mouth of the chamber 20 the materials are but slowly heated in consequence of the reduction which absorbs heat. Lower down, however, the temperature increases and the materials are reduced to pasty form and would have difficulty in descending if this portion of the reducer had not been enlarged in cross-sectional area. The shape of the reducer $e$, as shown in Figs. 2, 3, and 5, is therefore of importance so far as the proper feeding of the materials is concerned. The reduction of the oxids takes place in the upper part of the reducer $e$ in the chamber 20 above the zone of fusion in the crucible or lower portion 25 of the reducer $e$. Inasmuch as the solid oxids mixed with the solid fuel (coke) react very slowly, a complete reduction of the material would not take place before the zone of fusion is reached if the heat from the crucible alone were used in the reduction. Hence a reducing-gas (carbon monoxid) is passed through the materials in the chamber 20 and reduces the materials in said chamber before the fusion zone is reached. For this purpose a portion of the gases arising in the mouth or top of the reducer $e$ and which gases are rich in carbon monoxid are taken through a pipe 21 by means of an exhaust-fan or blowing-engine 22 and are blown at high pressure through a pipe 23 and nozzles 24 and 25 into the crucible or fusion zone a little above the level of the slag. These gases finding at the top of the crucible incandescent coke are completely transformed into carbon monoxid, the carbon dioxid, ($CO_2$,) which represents their condition after leaving the mouth of the reducer, being formed into carbon monoxid ($2CO$) after leaving the incandescent coke. This carbon monoxid is a very energetic reducing agent and traversing the chamber 20 will reduce the charge in said chamber before said charge reaches the crucible or fusion zone. The main feature of this step in the present invention consists in taking gases from the mouth or top of the reducer and forcing them into the fusion zone in contact with the incandescent carbon fuel to thereby convert the gases into carbon monoxid and thereafter forcing the carbon monoxid through the charge to reduce the oxids prior to their entrance into the crucible or fusion zone of the reducer. The gases taken from the mouth and blown into the fusion zone of the reducer perform another important function. It is well understood that as the materials descend in the reducer and pass into the crucible completely reduced they are incapable of giving off rising gaseous material, or, in other words, are impervious to nascent gas. It is also known that the electric current transmits heat to the material forming the resistance without of itself causing gaseous matters to be formed or driven off. Hence it will be seen that the heat of the electric current will be confined to the fusion zone by the blanket of reduced oxids and cannot pass rapidly upward into the chamber 20, where additional heat is required to aid in reduction. Therefore it is necessary to provide means for transferring into the chamber 20 the heat in the fusion zone or crucible derived from the electric current. The blowing into the fusion zone of the gases taken from the mouth of the reducer serves as the means for transmitting the heat of the fusion zone or crucible to the materials to be reduced. The steps in the reduction of the materials performed by the waste gases may therefore be said to be, first, the circulation of the gases from the mouth to the crucible or fusion zone of the reducer and the conversion of these gases into carbon monoxid at the fusion zone, and, second, the forcing of the carbon monoxid thus formed through the charge to be reduced to present an energetic reducing agent to the materials and to transmit the heat from the fusion to the reducing zone of the reducer.

Inasmuch as the base or crucible 25 of the reducer is flaring or bell-mouthed, the gases blown into the crucible are permitted to circulate around the mineral and penetrate the same to reach the fragments to be reduced. There is also a large surface of mineral presented to the gas in the crucible and a large annular space 26 around the descending column of material around which the gases may collect, circulate, and penetrate said column. To facilitate the passage of the carbon monoxid upward through the materials in the chamber 20 of the reducer, the center of said materials is formed principally of relatively large pieces, thus leaving between the pieces more space for the circulation of the gases than if the charges of materials were packed more solidly. This formation is secured by the arrangement of the two chargers 8 and 9 for the mineral, which alternately discharge at diametrically opposite points of the chamber 20, and of the heater 17, which discharges the coke in large pieces into the center of the chamber 20, as clearly illustrated in Figs. 1 and 3.

The crucible 25 or fusion zone of the reducer $e$ must not only be adapted to carry on the continuous fusion of the reduced materials, but it should also be arranged so that it can accomplish the following functions: First, it must furnish the auxiliary heat which shall convert the gases into carbon monoxid and shall convey heat through said gases to the materials to be reduced; second, it must permit of the generation of heat by means of the electric current; third, it must be furnished with means whereby the crude metal can be separated from the slag, and, fourth, it must permit of the tapping out of the crude metal and of the slag either continuously or by small successive tappings.

To produce not only the heat for fusion, but also the auxiliary heat to be transmitted to the chamber 20 of the reducer, requires in the crucible 25 great electric energy, and if the output of the apparatus is relatively great it will be found economical and efficient to divide up the total electric energy required by passing the same through a series of electrodes, whereby the difficulty of transmitting through a single pair of electrodes the intense current is readily avoided. The crucible 25 should therefore have a diameter relatively much larger than that of the chamber 20 in order to permit of the use of a number of electrodes, and the formation of the reducer e with a lower bell-mouthed crucible 25 readily attains this end, as well as the ends heretofore described. It is preferable to divide up the current, as illustrated in Fig. 4 of the drawings, wherein four separate currents are used with four pairs of electrodes 27, although, of course, any number of electrodes may be used, if desired.

In order that the electric current or currents may develop in the crucible the heat of which it or they are capable, the carbon electrodes 27, carrying the current, must be in contact with the slag 28 and must be kept constantly in contact therewith if regularity in the production of heat is to be maintained. The slag 28 forms a resistance between the electrodes and will absorb the heat and transmit it, first, to the crude metal which accumulates in driblets below the slag and, second, to the gases circulating in the crucible, which are projected downward by their velocity and lick the surface of the liquid bath. Without excessively increasing the length of the electrodes 27 and still permitting them always to contact with the slag 28 it is necessary that the openings through which they pass into the crucible should be only a small distance from the base or sole of the crucible, as illustrated in Fig. 5. It is likewise preferable that the openings should not be in the vertical wall, but in the dome or top wall of the crucible in order that the electrodes 27 may be inclined as nearly to the vertical as possible, so that they may better accommodate themselves to the variations in height of the slag. In the construction of the reducer e, therefore, the top a of the bell-mouthed crucible 25 should be but a small distance from the sole or base, and hence the arch a of the crucible is very flat.

To maintain the electrodes more constantly in contact with the slag, the variations in the height of the slag should be small, and if the variation should be great it must take place at rare intervals. This condition is satisfied in the present apparatus, first, by using a large crucible in which variations in height of the liquid bath is less noticeable and, second, by arranging for the tapping of the slag and metal as nearly constant as possible and when all the metal must be tapped by tapping the metal in small quantities at a time in order that the variations in level may be less accentuated.

The separation of the slag 28 from the metal 29 and the continuous tapping of each when possible is secured by the arrangement illustrated in Figs. 2 and 3. A dam 30, of brick or sand, surrounding the front 31 of the crucible 25, permits of the adjustment of the height of a gutter b, through which the metal 29 flows continuously into a regulator 32. The height at which the gutter b is formed regulates the height of crude metal in the crucible, variations arising from the pressure exerted by the slag and gases upon the metal being taken into account in arranging the gutter b. The slag 28 is continuously tapped with a Zürmann pipe, and a constant level is obtained in a manner analogous to that obtained in the metal. The thickness of the slag 28 above the metal 29 should be maintained sufficiently large to permit of the carbons having a considerable length without being liable to penetrate the metal or to pass out of the slag.

To regularly and economically work the reducer e, it is necessary to prevent the entrance of air to its interior, and consequently maintain the pressure of the gases inside the reducer. To attain these objects, at the top of the reducer e are arranged two passages for the outlet of the gases from the reducer-mouth, each passage being separate and removed from the other and preferably arranged, as shown, diametrically opposite to each other. One passage 34 takes off part of the gases into a pipe 21 and are blown by a fan or blowing-machine 22 through the pipe 23 and thence distributed through pipes 24 into the crucible 25. This portion of the gases, as before explained, traverses the reduction-chamber 20 and again collects in the mouth of the reducer e. The remainder of the gases pass out by the pipe 36, and a portion thereof is sent to the calciner d through the pipe 39 to heat the materials in said calciner, whereas another portion passes through the pipe 40 to any suitable point of discharge. The gases passing from the pipe 36 never reënter the reducer e. In order to prevent an outward draft from the mouth of the reducer e through the pipe 36, which would tend to make a vacuum in said mouth and cause an inrush of air, the gases passing out are forced to pass through the box 37 and cannot pass through the valve 38 to enter the pipes 39 and 40 unless the pressure of gas is sufficient to lift said valve. This causes a constant pressure to be maintained between the valve and the mouth of the receiver. The valve 38 is fixed to a movable cover 41 of the box and is lifted with it only when the pressure of gas is sufficient. The valve 38 closes when the pressure falls. The pressure is fixed by the difference of the level of the water in the channel 42, which forms the seal for the lid 41, and this difference is regulated by the height of the outlet of a siphon 43.

The last portion of the apparatus is the regulator 32, into which the crude metal 29 from the reducer flows directly. In this regulator or refining-oven 32 the metal is brought to the state of purity required. The regulator or refining-oven is illustrated in detail in Figs. 6, 7, and 8. It consists of a chamber or crucible the horizontal section of which is circular. It is provided with a charging-door 44, a gutter 45, forming the continuation of the gutter b, through which the metal flows from the crucible of the reducer into the crucible of the regulator. It is provided with a tap-hole 46 for the metal 47 and a tap-hole 48 for the slag 49. It is heated by means of electric energy transmitted to the liquid metal by the carbon electrodes 50, passing either through the dome or lateral walls of the crucible. The electrodes 50 may be either inclined or vertical.

The main features of the refining-oven or regulator 32 are—

First. Its immovability, which distinguishes it from the ordinary converter. The object of making it immobile is so as to keep the metal-bath as still as possible, and thus prevent it from mixing with the slag. In steels of great purity made by this process this object is of great importance.

Second. The crucible or refining-oven being circular in horizontal cross-section permits the use of a metal casing lined with a refractory material. Its base is formed of iron plates, which, resting upon the ground and being also lined with refractory material, prevents deformation of the floor of the crucible. The vertical wall consisting of the cylindrical iron plates makes a strong and economical construction. The annular plates rest upon the base-plates and are joined thereto to be thereby reinforced at their base. The top of the annular casing is also reinforced by a ring or flange 51, which supports the thrust of the dome 52, formed, preferably, of a single brick.

From the foregoing description it will be understood that the apparatus described is designed for the complete conversion of the iron ore into refined metal by a continuous series of electrometallurgical operations. In this conversion the excess heat of the fusion zone is used to assist in the reduction of the calcined materials, and the excess or waste gases arising from the reduction are utilized in the calcination of the ore, the flux, and the carbon reducing agent.

Having thus described the nature and objects of my invention, what I claim as new, and desire to secure by Letters Patent, is—

1. In an apparatus of the character described, an electric furnace having at its base an enlarged crucible-chamber, a series of electrodes penetrating said crucible-chamber and forming the poles of an electric current, a discharge from said crucible-chamber, means for conveying gas under pressure from the mouth of the furnace into the crucible-chamber adjacent to the electrodes, a refining-oven and means derived from the electric current for heating said oven, said refining-oven arranged adjacent to the discharge of the crucible-chamber of the furnace.

2. In an apparatus of the character described, an electric furnace having its base bell-mouthed to form an enlarged crucible-chamber, a series of electrodes penetrating the roof of said crucible-chamber and forming the poles of an electric current, and means for conveying gas under pressure from the mouth of the furnace into the crucible-chamber adjacent to the electrodes.

In testimony whereof I have signed this specification in the presence of two subscribing witnesses.

HENRI HARMET.

Witnesses:
PAUL DE MESTRAF,
EDWARD P. MACLEAN.